Nov. 26, 1929.  A. W. MARSDEN  1,737,254
VEHICLE BRAKE EQUALIZING SYSTEM
Filed Nov. 8, 1928  3 Sheets-Sheet 1
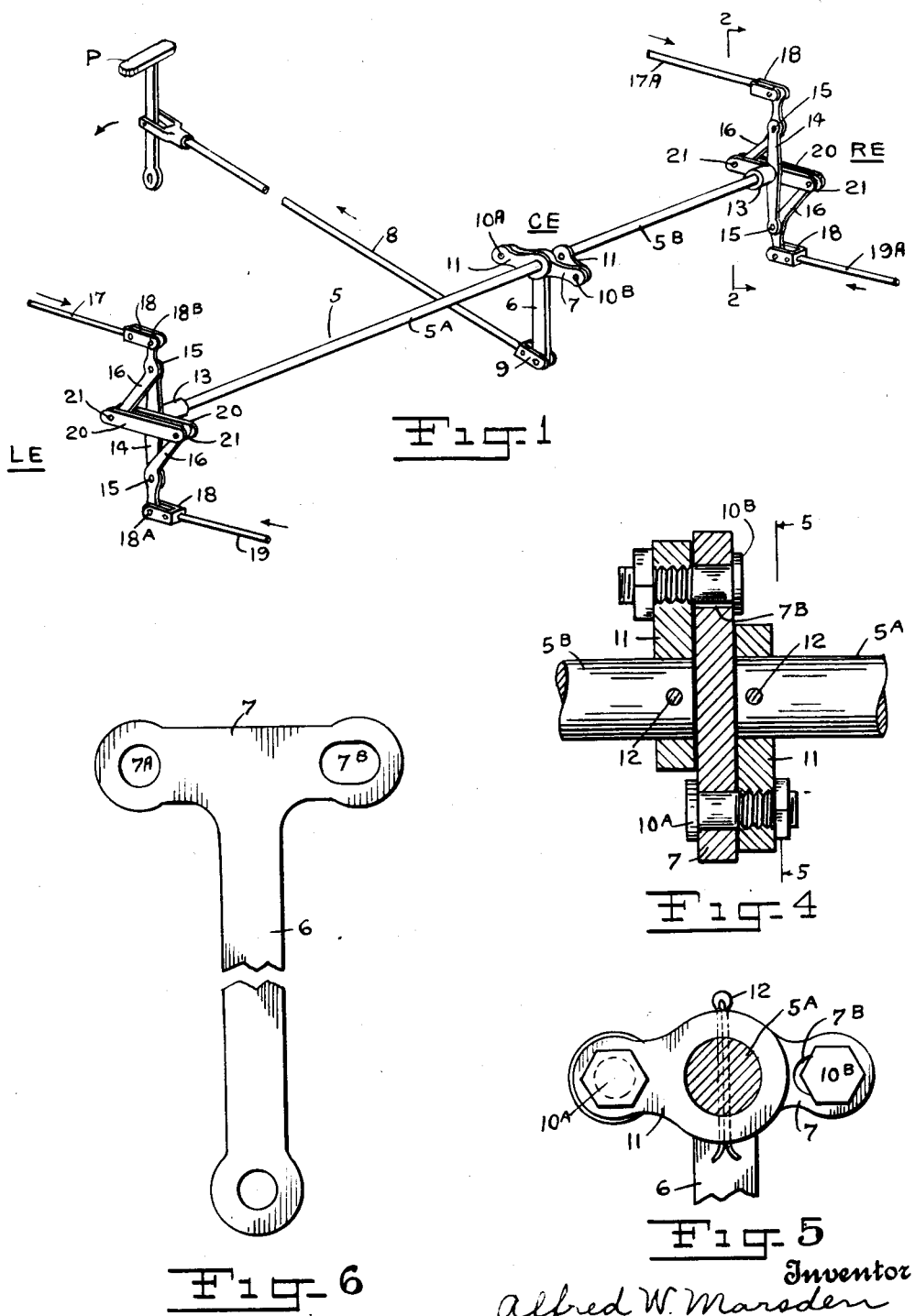

Nov. 26, 1929.   A. W. MARSDEN   1,737,254
VEHICLE BRAKE EQUALIZING SYSTEM
Filed Nov. 8, 1928   3 Sheets-Sheet 2
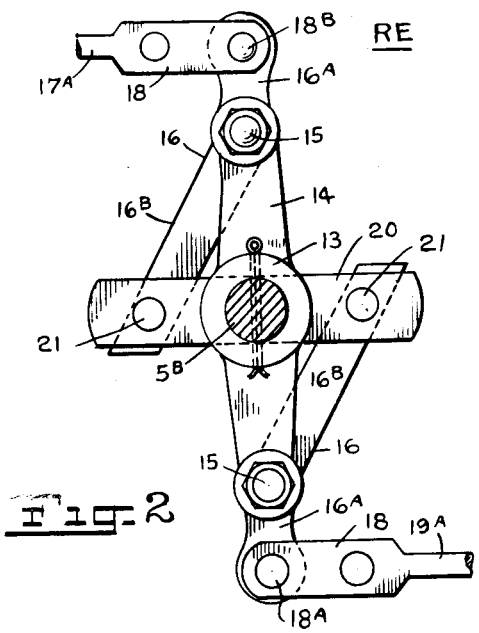
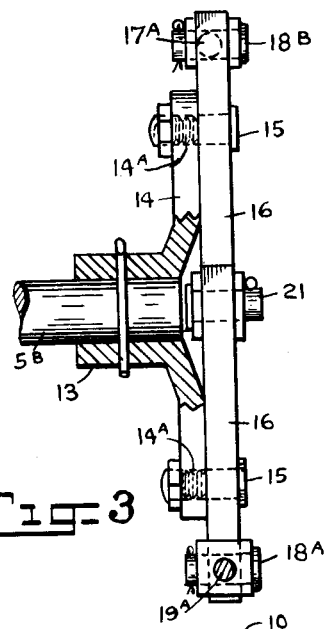
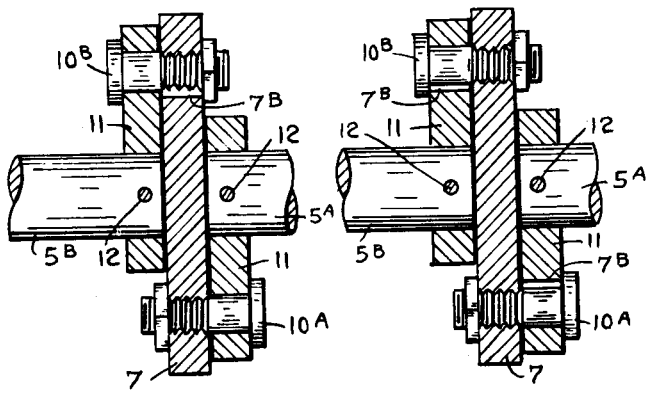
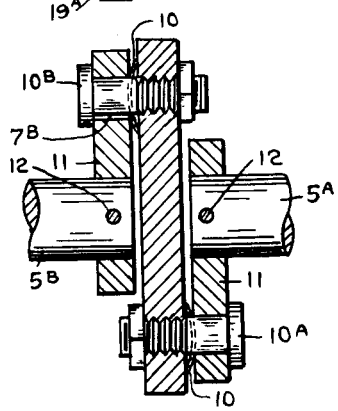
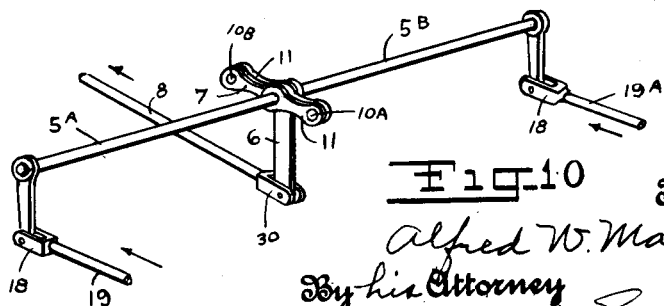

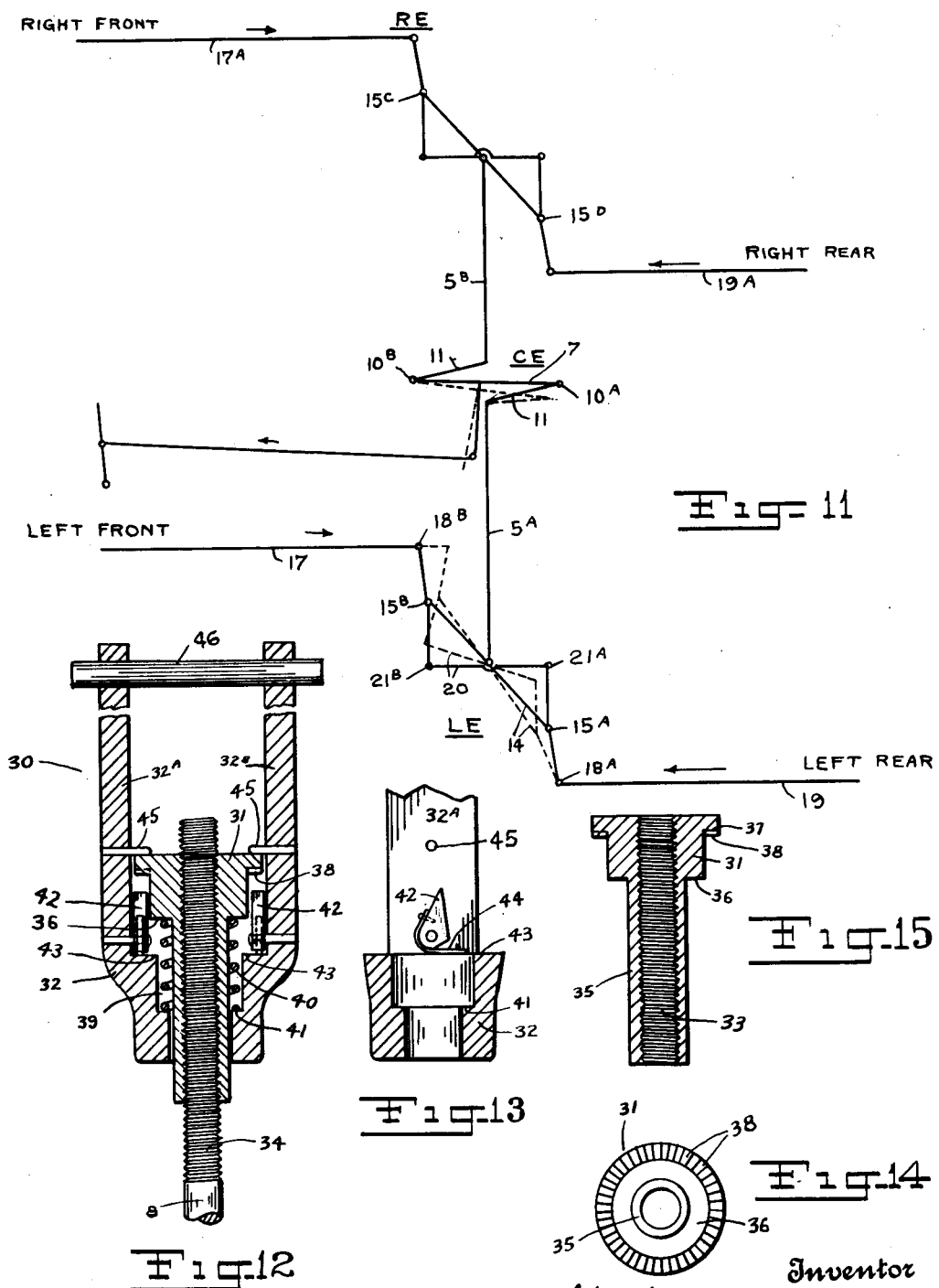

Patented Nov. 26, 1929

1,737,254

UNITED STATES PATENT OFFICE

ALFRED W. MARSDEN, OF LYKENS, PENNSYLVANIA

VEHICLE BRAKE-EQUALIZING SYSTEM

Application filed November 8, 1928. Serial No. 317,915.

This application is a continuation in part of my application for vehicle brake equalizer filed January 17, 1928, Serial No. 247,346.

The improvements embodied in said patent application and continued herein, relate in general, to braking means for vehicles and the like, and more particularly to those vehicles having brakes on a plurality of wheels and to means for automatically equalizing or balancing the force which is applied to the brakes on the different wheels.

A primary object, among others, is to provide a simple self adjusting brake control mechanism for vehicles of the aforementioned type, which automatically compensates for wear on the brake bands, connections, bearings, for new conditions occurring from replacement of parts or other contingencies and which automatically maintains an equal pressure on all such brakes and retains a new relation of parts with respect thereto.

A further object of the present improvements is to provide a simple self adjusting brake assembly that permits changing of the ratio of the braking force applied to the front and rear wheel brakes, or to any one of them without manually changing the structure or design of the parts, and when such ratio is obtained, will maintain that ratio.

A further object is to provide an equalizing assembly adapted to form a part of the equipment of vehicles at the point of manufacture or to replace existing brake mechanisms on completed cars, which is self adjusting and self maintaining under each of a plurality of successive predetermined conditions.

Another object is to provide a simple brake assembly of the aforementioned type involving a minimum of parts, requiring minimum bearing supports on the chassis, which includes no springs or delicate members requiring replacement or repair.

The present improvements further provide a self adjusting brake assembly wherein the moving parts operate through a minimum distance, dependent among other things, on the wear and which multiplies and amplifies the foot pressure on the brake bands two or more times without increasing the distance through which the foot pedal travels.

A still further object is to provide a simple self adjusting brake and equalizing assembly which will maintain an equal braking force on all four wheels when rounding a curve, as well as straightaway, such assembly also functioning in like manner with respect to all operative brakes in the event of failure or total fracture of one or more brake rods.

Further objects include the provision of an equalizing unit between the distributing shaft and a pair of brake rods disposed on one or both sides of the vehicle and connected with the brake bands and/or an equalizing unit between the brake pedal rod and the distributing shaft, so that with one or more of such units, dependent on the number of brakes, viz two or four, the force or pressure exerted by the operator on the foot pedal is equally distributed to the brake bands at the same or opposite sides of the vehicle.

A further object is to provide an automatic take-up device which infinitesimally shortens the foot pedal rod upon each application of the pedal, thereby automatically compensating for wear, etc.

Other objects and advantages of the present improvements will be apparent to those skilled in the art upon reference to the original and accompanying description in the specifications and drawings in which—

Fig. 1 is a perspective view of a portion of a vehicle brake assembly, illustrating the present improvements as applied to four wheel brakes;

Fig. 2 is a transverse sectional view taken on line 2—2 of Fig. 1, showing a side equalizer arrangement;

Fig. 3 is an end elevation of the structure shown in Fig. 2;

Fig. 4 is a sectional view through a control equalizing unit connecting brake pedal rod and distributing shaft;

Fig. 5 is a side elevational view of the structure of Fig. 4 taken on line 5—5 thereof;

Fig. 6 is a side view of the lever forming a portion of the central equalizer;

Figs. 7, 8 and 9 are views similar to Fig. 4, illustrating various arrangements of the central equalizer connections;

Fig. 10 is a view similar to Fig. 1, illustrating the adaptation of the present improvements to two wheel brakes;

Fig. 11 is a diagrammatic perspective line drawing of a brake control system embodying the equalizers and illustrating the action thereof under a certain abnormal condition;

Fig. 12 is a sectional view of the automatic take-up clevis;

Figs. 13, 14 and 15 are details of the parts illustrated in Fig. 12.

Referring to the drawings, a rock shaft 5, for distributing force or pressure, may be journaled transversely of the vehicle body in suitable bearings. Said shaft may be positioned on the chassis at any convenient location and comprises shaft sections 5A and 5B disposed in longitudinal alignment, as illustrated, with their adjacent ends spaced from each other at any point between the sides of the vehicle. Although said shaft sections are adapted to rotate together, however, as hereinafter described, said shaft sections 5A and 5B are also adapted to rotate independently, and it is therefore apparent that any other manner of obtaining such movement may be employed without departing from the scope of the invention, the structural arrangement illustrated embodying one manner of attaining the desired result.

Interposed between the adjacent ends of the shaft sections 5A and 5B, a T-shaped lever or power arm 6 is arranged, having the cross head 7 disposed between the ends of said shaft sections, as illustrated, and its longer leg disposed downwardly therefrom. Adjacent its lower end, the lever 6 is connected with the brake pedal rod 8, which extends directly or by means of connections necessary to the design of the vehicle, to the foot pedal P of the car. The connection between said lever and rod 8 may be made in any suitable manner as by clevis 9. The clevis 9 may be replaced by the automatic take up clevis 30, illustrated in Fig. 12, or said clevis 30 may serve to connect rod 8 to pedal P, as desired.

This take up device consists of a bushing 31 freely slidable in the longitudinally bored body of the clevis 32. The bushing 31 has a threaded bore 33 into which the threaded end 34 of rod 8 may be screwed. The skirt 35 of the bushing, serves as a guide by cooperating with the bore of clevis 32 and also protects threads 34 of the brake pedal rod. In forming bushing 31, an annular shoulder 36 and an annular flange 37 are provided, as illustrated. The downwardly disposed surface of the flange 37 consists of a plurality of teeth 38 as clearly seen in Fig. 14.

Clevis 32 is counterbored at 39 to accommodate coil spring 40, which acts between shoulders 36 and 41 to normally separate bushing 31 and clevis 32 so that pawls 42 will normally be out of contact with teeth 38. Mounted slightly above the inner annular surface 43 of the clevis body is a plurality of pawls 42. Two such pawls may suffice and are illustrated in Fig. 12 where they are provided inside clevis arms 32A and 32B which protect same and on which they are pivotally mounted. Each pawl is normally held in the position illustrated in Fig. 13, in any desired manner, as for example, by a spring 44. Arms 32A and 32B are provided with stop members 45 for a purpose hereinafter described.

In operation, the pivot 46 may be secured to the foot pedal P and the rod 8 to the central equalizer C E by clevis 9; or the device may be reversed and the rod 8 attached to the foot pedal P, and pivot 46, to the leg 6 of the central equalizer. In either case, when the pedal is depressed, a pull is exerted on pivot 46, causing clevis 32 to move towards bushing 31, in opposition to spring 40, the bushing remaining stationary due to the braking resistances transmitted to rod 8. This pull on clevis 32 overcomes the resistance of coil spring 40, permitting surface 43 of clevis 32 to approach the extending shoulder 36 and flange 37 of bushing 31. The length of pawls 42 is slightly greater than the distance between shoulder 36 and flange 37 and therefore the pawls approach and engage teeth 44 of flange 37 before shoulder 36 and surface 43 interengage. Due to the inclined position of said pawls, as well as the rigidity of rod 8 and clevis 32 which cannot rotate, the bushing 31 is revolved a slight amount, until surface 43 of clevis 32 engages shoulder 36 on bushing 31. The pitch of the threads of rod 8 and bushing 31 is such that this slight turning of the bushing will take up or shorten the rod 8 a slight amount.

When clevis 32 and bushing 31 meet by the interengagement of surface 43 and shoulder 36, the strain of the braking is borne at this annular contact, and the parts therefore function as a unit. It is evident that no strain is borne by the pawls 42 when the brake is fully applied. Upon release of the brakes, the spring 40 expands, causing bushing 31 to move away from clevis 32 until the former is stopped by pins 45, and springs 44 return the pawls 42 from their greater inclined position which they took in the operation, to the original slightly inclined position of Fig. 13.

The device is accordingly again ready to function as described and to turn the bushing 31 a slight amount upon subsequent application of the brakes. Accordingly the rod 8 and pedal P may retain their proper positions for accomplishing their full strokes, and prevent any natural tendency of pedal P to incline downwardly toward the foot board of the vehicle, due to wear on the brake bands.

The pitch of the threads of rod 8 and bushing 31 may be predetermined at the time of manufacture so that upon each depression of the pedal, an infinitesimal shortening of the rod occurs due to the automatic take-up construction. The amount of take-up may be one thousandth of an inch or any fractional part of an inch, dependent on the predetermined pitch given to the threads. Obviously therefore the take up may be greater where vehicles are used on mountain roads or as taxicabs and wear on the bands is greater, than on pleasure vehicles where little extra burden is placed on the brakes.

It is notable that the arrangement may take other forms, that shown being only one embodiment of the idea preferable for vehicular use. The arrangement may be utilized with any type of brake control, with any number of brakes and with or without the equalizing arrangement herein further described. In any event, the provision of the automatic take up device eliminates the necessity of manual and periodic adjustment of the brake pedal and rod.

The T-head of lever 6 is preferably disposed longitudinally of the car, one end of said member being provided with an opening 7A through which a pivot pin 10A is inserted and the other end of said member having a slot 7B through which a pivot pin 10B is inserted. Upon each of these pins, one end of a link 11 is attached, having their opposite ends apertured or otherwise adapted, to receive the opposing ends of the shaft sections 5A and 5B. Cotter pins 12 extend transversely through the shaft sections and the respective links thereby serving to key the link 11 to its respective section so as to transmit movement from one to the other. Any other method may be employed for fixing the links 11 to the sections 5A and 5B so that section 5A and its link 11 may rock as a unit, and section 5B and its links 11 may rock as a unit.

It is notable that the pivot bolts 10A and 10B are provided with heads and nuts whereby the inner faces of the links 11 may be held firmly against the adjacent faces of the T-head 7. By tightening the nuts to the desired degree, these parts are held in intimate contact and normally move as a unit due to the frictional engagement therebetween. Said bolts may have screw threaded relation with links 11, as illustrated in Fig. 4. Accordingly, an outward thrust on pedal P (in the direction of the arrow, Fig. 1) will cause elements 6, 7, 11, 5A and 5B to move, under normal conditions, as a unit due to the frictional contacts at bolts 10A and 10B. It is seen therefore, that the lever 6 is suspended at these points and that said points or pivots at 10A and 10B describe an arcuate course.

Numerous other methods for insuring such frictional contact at these pivotal points over long periods of use may be employed, as for example those illustrated in Figs. 7 to 9. In Figs. 7 and 8, the apertures in T-head 7 are internally threaded to receive the screw bolts 10A and 10B, whereby the frictional union is enhanced. In Fig. 9, this screw threaded relation is supplemented and the frictional engagement increased by the provision of dished spring washers 10, interposed between elements 11 and 7 as illustrated. Reference may also be had at this time to the different arrangement of the slot 7B in these forms. In Fig. 7, this slot is illustrated near one end of head 7. In Fig. 8, the slots 7B are provided in each link 11, as illustrated. In Fig. 9, but one link 11 is so provided. The arrangement of the slots and the manner of obtaining the frictional relation may be varied as desired.

For convenience of description the foregoing structure will hereinafter be referred to as the central equalizer. In Fig. 10, an arrangement for two wheel brakes is illustrated, and although the links 11 are illustrated as extending in directions opposite from those in Fig. 1, it is understood that the operation will be the same in either case, and may be used in either manner with two or four wheel brakes. The diagrammatic view of Fig. 11 shows the central equalizer reversed from its position of Fig. 1, that is, the central equalizer is illustrated in Fig. 11 as it is in Fig. 10. The improvements will operate as ascribed, in either position of said equalizer, the change being for convenience in diagrammatic illustration and description.

Referring now to the side equalizers, it is notable that these are of identical construction on each side of the vehicle, and therefore but one only will be described. Upon each of the outer ends of shaft sections 5A and 5B of the rock shaft 5, a sprocket member 13 is keyed or otherwise fixed, upon which is formed a cross head 14 having its ends extending oppositely and at right angles to the shaft. Adjacent each end of member 14 an aperture 14A is provided for receiving a pivot pin or bolt 15, to provide a pivotal mounting for a bell crank lever 16 at or near both ends of the cross head 14. Each bell crank lever 16 connected to member 14 by bolt 15 through aperture 14A is frictionally held thereto, so that under normal conditions, the member 14 and one or both levers 16 rock as a unit whereby the pivotal points at 15 describe arcuate travel. This frictional contact may be obtained in any manner, as previously set forth with respect to the central equalizer. That is to say, the dished spring washers 10 and/or the internal threads to receive the bolts may be employed in any convenient manner, or the mere friction of the contiguous faces due to the tightness of the nuts may be relied upon.

The outwardly extending arms 16A of the bell cranks 16 are connected to a brake spring rod of the adjacent brake band. These front brake rods 17, 17A and rear brake rods 19, 19A are connected by clevises 18, as illustrated, to their respective arms 16A. The inwardly extending arms 16B of adjacent bell cranks 16 are connected by links 20, preferably composed of a pair of spaced links disposed on each side of the arms 16B and connected thereto by means of pivot pins 21. Said pivots may take the form of a bolt and cotter pin. It will be seen upon inspection of Fig. 3 that the outwardly extending portions of cross heads 14 are slightly offset with respect to the outer ends of the sprocket members 13, so as to prevent interference therewith by the links 20 and pins 21, during operation of the equalizer.

Reference throughout the specification to "normal conditions" is understood to mean such conditions wherein the brakes, brake actuating means and equalizers need no adjustment. Assuming that the entire mechanism is in adjustment, pressure upon pedal P (see Fig. 1) will cause the entire system to move as a unit, due to the frictional contacts at 10A, 10B and points 15, all of which describe only arcuate travel, under such normal conditions. Accordingly, movement of rod 8 forward in the direction of the arrow, will cause the central equalizer and shaft sections 5A and 5B to rock as a unit, in their bearings and the side equalizers will rotate likewise causing the brakes to be applied by pulling rods 17, 17A, 19, 19A in the direction of the arrows (Fig. 1).

Let it now be assumed that the left front brake band which rod 17 applies, is worn more than the other three. The operation of the arrangement under these circumstances is diagrammatically illustrated in Fig. 11, wherein pivotal points 15 have been designated 15A, 15B, 15C and 15D for convenience in description. When brake pedal P is intially depressed, rod 8 moves forward and the system moves as a unit, as previously described, the central (C E) and side equalizers (R E and L E) rotating with the shaft sections 5A and 5B, all in a clockwise direction until the three brakes in adjustment touch their respective brake bands.

While the side equalizer L E is slowly rotating and the rod 19 connected at 18A is thus pulled forward (in the direction of the arrow for applying the brake), the left rear band engages the left rear drum and the movement of rod 19 is temporarily arrested, thus establishing a resistance and a fulcrum at 18A, while points 15B and 15A of the equalizer L E continue to rotate (clockwise) due to the continued pressure or force of shaft section 5A and cross member 14 acting on the equalizer members at said points. It is notable that this continued clockwise movement of members 5A and 14 is permitted by the construction of the central equalizer C E, for under the assumed conditions, both brakes on the right side of the car have been applied at the same time with the left rear brake. Accordingly, a resistance and a fulcrum is established at point 10B and accordingly the force continued to be applied to the rod 8 is experienced by the members intermediate fulcrum 10B and fulcrum 18A, whereby shaft section 5A and cross member 14 of the equalizer L E continue their clockwise travel.

It is obvious that the continued application of the foot pedal force on rod 8 and leg 6 of the T-shaped member to the assembly at a point intermediate fulcrums 10B and 18A, will overcome the frictional resistances or contacts at points 10B, 10A and 15A, with the resultant slipping of the parts at these points and a consequent relative movement therebetween. That is to say, point 10A now becomes a pivotal point and the link 11 and head 7 move relative to each other at this point although said point is also describing arcuate travel. Obviously, the cross head 7 moves downwardly (in this instance) about the fulcrum 10B, with respect to link 11 and shaft section 5B, which latter, as described, do not now move. Likewise, the frictional contact at 15A is overcome, and the point 15A becomes a pivotal point at which the force of the downwardly directed half of member 14 (as it rotates clockwise) is exerted to pull the lowermost lever 16 to the left about 18A as a fulcrum. This lever 16 and member 14 accordingly slip or move relative to each other, although point 15A is also describing clockwise travel.

As said lever 16 moves to the left, its upper point 21A, through links 20, forces point 21B (of the upper lever 16) to the left and about 15B as a fulcrum (the frictional contact at this point being overcome) thus causing point 18B to move to the right in the direction of the arrow for applying the left front brake. The described change of the relation of the central and side equalizer (C E and L E) parts between points 10B and 18A will continue until compensation is made for the worn band of the left front brake, i. e., until the resistance of the rods 17 and 19 is equal at points 15A and 15B, after which the central (C E) and side equalizer L E will move as a unit with the other side equalizer R E, due to the frictional contacts at pivots 10A, 10B, 15A and 15B and thereby the entire system exerts pressure on the front and rear brakes equally or in accordance with the predetermined ratio (hereinafter described).

In Fig. 11, the full lines show the system at the time the automatic self adjustment begins and the dotted lines show the new relation of the parts at the termination of the adjustment, and from which set position the system functions as a unit to apply all brakes equally.

The braking system has thus been automatically self-adjusted by depressing the foot pedal which is now down and applying all four brakes equally. But upon release of pressure on the pedal P, the system does not return to its original unadjusted relation of parts, but maintains the new (dotted line) relation of parts established by itself in the above described adjusting operation. Accordingly, upon release of pressure on pedal P, the system is released as a unit and the parts remain in their newly set relation due to the frictional contacts at the points where compensation was made. Thereafter, because of this one automatic adjustment, all brakes are in adjustment and are applied equally upon subsequent depression of the pedal. It is thus seen that with this arrangement, the adjustment does not take place every time the pedal is depressed, but where adjustment is needed, one application of the brakes gives a new set to the system, under which new set the brakes function equally thereafter.

This maintenance of the system in the new adjusted relation exists, until such future time when the same or another band is worn, until a rod may be fractured, until a band or drum is replaced, or until any other conceivable fault occurs to throw one or more brakes out of adjustment. Under any or all of these circumstances, upon the depression of pedal P, the system adjusts itself at the points necessary and assumes a new relation of parts which it automatically maintains, until another emergency.

It is obvious that in order to accomplish the result above described in detail, the equalizer L E must revolve more than equalizer R E. As described, this is taken care of by the central equalizer C E, but it is notable that, depending upon where the adjustment is needed, the cross head 7 will be called upon to revolve about a different axis, with a greater or shorter radius as the case may be. This necessary change, unless provided for, would cause stoppage of rotation of head 7, and the slot 7B has accordingly been provided so that the radius of head 7 may be automatically extended or shortened, as required. As noted, this slot or slots may be arranged in any manner, so that head 7 and link or links 11 may have longitudinal movement with respect to each other.

Should a front or rear brake on the right hand side be out of adjustment, the central and side equalizer (C E and R E) will function similarly, as above described. Likewise, if the rear left brake is out of adjustment, the equalizers C E and L E will function similarly to compensate therefor.

Automatic self adjustment and maintenance in a new relation will also take place where two brakes on the same side are out of adjustment, in which event the central equalizer C E will revolve about one of its floating pivots 10A or 10B as the case may be, to a greater extent before the side equalizer performs its office, after which one or both complete the compensation which is thereafter maintained. Likewise, the same result is obtained where two brakes, one on each side, are out of adjustment. In such event, all equalizers adjust themselves and maintain the new relation. Where a new band or drum is placed on only one wheel, thus throwing out the other three, the self adjustment and maintenance will likewise result. In general, the establishment of the fulcrum points, between or about which the self adjustment and maintenance takes place, is dependent on that brake or brakes which are not out of adjustment, or first offer resistance to the system.

In the event that the frictionally held pivots are not used, and the ordinary pivots are provided, the automatic self adjustment will then take place each time the foot pedal is depressed. The present improvements are accordingly adapted to perform the ascribed function and results with frictional contacts at the points indicated, or with other types of pivots.

Referring to Fig. 10, the present improvements are illustrated as applied to two wheel brakes. The system illustrated in Fig. 1 but with rods 17 and 17A dispensed with, may likewise be employed for two wheel brakes. In either system employed, the parts adjust themselves upon depression of the foot pedal, and upon release of pressure maintain such adjusted position. In Fig. 10, the compensation takes place at the central equalizer C E. In the event that the device of Fig. 1 as altered, is used, the side equalizers, after acquiring their correct positions to transmit movement from the transverse shaft to the brake rods, will retain such positions, while the central equalizer C E will function as described.

A further feature of the improvements resides in the fact that the pressure on pedal P is amplified or multiplied without increasing the travel of pedal P. During the self adjusting operation, the effective length of leg 6 (of C E) is increased, due to the fact that when a fulcrum is established at 10A or 10B, for example at 10B, the extent of head 7 and link 11 (attached to 5A) becomes effective with leg 6 to increase the mechanical advantage between the point of application of the force, at 9 and the work at 5A. This increased leverage accordingly amplifies the pressure or force exerted by pedal P on the brakes, without increasing the downward travel of the pedal.

In practice a desirable braking ratio for front and rear brakes is sixty per cent (60%) of the braking done by the rear brakes and forty per cent (40%) done by the front brakes. But this ratio or any desired ratio can be obtained, at the time of manufacture, without departing from the scope of the present improvements, by suitably positioning the members on each side equalizer according to the ratio desired. That is, the location and dimensions of levers 16 can be predetermined at the time of manufacture and when this desired ratio is obtained, the equalization of a single or a plurality of brakes will not change said ratio.

In practice it is desirable to have the front brakes release quickly to eliminate any interference with steering and this requires a correspondingly stronger pull to apply the front brakes than the rear brakes. It is also common to have this pull exerted through a shorter distance than the rear brakes as in cases where the internal expanding type brake is used for the front brakes and the external contracting type used for the rear brakes. These differences in "pull" and "travel", can be obtained by suitably arranging the equalizer parts, and the ratio 60—40 or any desired ratio can be maintained. It will be apparent to those skilled in the art that this brake control can be made to comply with any mechanical brake in practice.

The present improvements have a further distinct advantage since they eliminate the necessity of manually adjusting the brakes. From the time the present system is installed on a new car at the factory, or on a used car as a replacement, to the time the car is withdrawn from use, no attention of a factory mechanic or a garage mechanic is necessary. Mere installation of the system in either of the above mentioned types of vehicles is all that is necessary, and when said cars are driven and the brakes applied by the driver for the first time, the system automatically sets itself in adjustment and thereafter maintains such adjusted relation until changing conditions call for additional automatic adjustment.

It is notable therefore that the driver need give no concern about the condition of his brakes, since the automatic adjustment takes place, whenever needed, and entirely without his knowledge. As a matter of fact, whenever wear occurs at a brake band, no matter how slight, there will be a corresponding infinitesimal self adjusting and maintaining operation in the system, upon depression of the foot pedal. Concern over a fractured brake rod is also eliminated, since the remaining brakes will be applied equally or according to the ratio, the loss of the resistance of the fractured rod being automatically compensated for.

Again, it is notable, that hot or ignited brake bands are eliminated since the self adjusting and maintaining system herein set forth, prevents the burden from being thrown on only one or two brakes. Furthermore, the efficiency of the present arrangement is not affected or impaired by water, mud, dirt or any foreign conditions that all brake controls are subject to due to their exposed position under the vehicle.

When a car equipped with the present system is rounding a curve of any degree, if the brakes are applied on the curve, the braking is the same as on a straightaway, that is, the outside front brake does not throw out but does its proportion of the total braking and does not interfere with steering. Upon applying the brakes on a curve, the system may establish and maintain a new "set", and if such is the case by reason of altered positions of the front wheels, etc. and for other reasons, upon subsequent use of the brake system on a straight stretch, that "set" acquired on the curve gives way to a new "set" which is automatically established under straightaway conditions of the wheels. Such operations are possible but do not necessarily occur each time a curve is encountered, unless conditions present themselves requiring the changes noted.

Various changes in the arrangement of parts and details of construction of the present improvements may be made without departing from the scope and purview of the invention. It is understood that the present improvements are not to be limited to the disclosed embodiments which are merely illustrative and that the form of the members and the location of the frictional means may be varied without departing from the scope of the invention.

I claim:

1. A force distributing device comprising an arm adapted to be moved upon application of a force, a plurality of members adapted to distribute such force, means operatively connecting said arm to said members, means associated with said members for exerting pressure from one to another, said arm and members having cooperating frictional surfaces whereby the relation between said arm and members is automatically changed and maintained in proportion to the resistances of said arm and members.

2. An equalizing assembly for a vehicle brake mechanism comprising a plurality of pivotally connected members, certain of said pivotal connections having cooperating frictional surfaces whereby they are ineffective as fulcrum points under normal brake relations, effective as fulcrum points under certain abnormal brake relations and subsequently ineffective as fulcrum points upon establishment of normal brake relations, said pivotal connections, upon being rendered ineffective as fulcrum points, adapted to retain such characteristic until subsequent variation in the relation of the brakes.

3. In a brake control mechanism, a power shaft, a member operatively connected thereto having points adapted to distribute power from said shaft in opposite directions, a power distributing element suspended on said member at each such point and extending in two directions beyond said points, force transmission means operatively connecting oppositely extending portions of said elements and suspended thereby and a brake application means associated with the portion of each distributing element not so operatively connected.

4. In an equalizing assembly for the brake bands of a vehicle comprising a sectional rock shaft journaled for rotation beneath the body of the vehicle and disposed transversely thereof, brake band attaching means at the outer ends of each of said sections and an equalizing unit carried at the inner ends of said sections comprising a lever having a T-head formed thereon and disposed vertically with its lower end forming a connection with the brake lever and links pivotally attached to the opposite ends of said T-head and extending in a direction toward each other for connection with the opposite sections of said shaft.

5. In an equalizing assembly for vehicles comprising a transversely disposed sectional rock shaft journaled for rotation beneath the body of the vehicle, brake band equalizing units carried at the outer ends of each of said sections and operatively connected with the brake band of the front and rear wheels of the opposite sides of the car, each of said units comprising a cross rod having its end extending in opposite direction at right angles to said shaft, a bell crank pivotally attached to each end of said cross member, a link connecting one end of each of said bell cranks for simultaneous movement, said other end of the bell cranks providing a connection with the front and rear brake bands at one side of the car and an equalizing unit arranged at the inner ends of the sections of said shaft and comprising a lever having a T-head formed thereon, said T-head extending longitudinally of the car, links connecting the opposite ends thereof with the respective sections of the shaft, said lever having its end opposite from the T-head connected with the brake pedal of the car.

6. In a brake control mechanism, a power shaft, a member operatively connected thereto having points adapted to distribute power from said shaft in opposite directions, power distributing elements mounted on said member and held in frictional contact therewith and extending in two directions beyond said points, force transmission means operatively connecting oppositely extending portions of said elements and a brake application means associated with the portion of each distributing element not so operatively connected.

7. In a four wheel brake system, the combination of a rock shaft, a cross arm fixed thereto, a bell-crank lever mounted adjacent each end of said arm, remote ends of each lever being connected to a brake rod, adjacent ends of each lever being operatively connected and cooperating frictional surfaces between said levers and cross arm for holding said parts in set relation after relative movement thereof.

8. In a four wheel brake system, the combination of a transverse shaft, each end of said shaft having a fixed arm extending at right angles thereto and on either side thereof, the ends of said arm each having a lever pivotally mounted thereon, frictional means between said arm and levers for releasably maintaining same against relative movement, one end of each lever being connected to a brake rod and a link connecting the other ends thereof.

9. In a brake system having a rotatable shaft, a side equalizer comprising an arm mounted for rotation with said shaft, brake rod connection members eccentrically mounted on said arm and cooperating frictional surfaces on said members and arm for holding said parts in set relation after relative movement thereof.

10. In a brake system having a rotatable shaft, a side equalizer comprising an arm mounted for rotation with said shaft, said arm having relatively movable members mounted thereon eccentric to said shaft, means for transmitting movement from one member to another and frictional means for holding said parts in set relation after relative movement thereof.

11. An equalizing device comprising a rocker arm, levers fulcrumed thereto on different sides of its axis, said levers adapted for revolving with said arm and for pivotal movement relative thereto, brake application means connected with each lever and frictional means coacting between said arm and levers for causing movement thereof as a unit.

12. An equalizing device comprising a rocker arm, levers fulcrumed thereto on different sides of its axis, said levers adapted for revolving with said arm and for pivotal movement relative thereto, a member connecting said levers for imparting movement from one to the other, brake application means connected with each lever and frictional means coacting between said arm and levers for causing movement thereof as a unit.

13. In a braking system, a sectional cross shaft, a radial arm fixed to each section, said arms extending in substantially opposite directions, means connecting free ends of said arms, cooperating frictional surfaces at said connections for releasably maintaining the parts in set relation and means operatively associated with said connecting means for rocking said shaft.

14. In a braking system, a sectional cross shaft, a member fixed to each section, said members extending in substantially opposite directions, means connecting said members at points thereon spaced from the shaft axis, frictional means for normally maintaining said parts against relative movement, and means operatively associated with said connecting means for rocking said shaft.

15. In a braking system, a transverse shaft having sections journaled for rotation, an equalizing unit suspended between the inner ends of said sections, said unit comprising a member fixed to each section and extending toward opposite sides of the shaft axis, a cross member suspended by said members adjacent their free ends, and means for imparting movement to said cross member.

16. A four wheel brake assembly comprising a transverse sectional shaft, a central and two side equalizers associated with said shaft, each side equalizer having two brake connection means, said means extending toward different sides of the axis of the shaft, said equalizers including frictional means for successively maintaining the compensating relations assumed by said equalizers in response to changing brake conditions.

17. A four wheel brake system comprising a sectional rock shaft, actuating mechanism for said shaft including an equalizer suspended between sections of said shaft, each section having a side equalizer with members extending on opposite sides of the axis of said shaft, one of said equalizers being provided with frictional means for maintaining the compensation automatically assumed under abnormal brake conditions.

18. A four wheel brake assembly comprising a sectional cross shaft, a member fixed to each section and extending toward opposite sides of the shaft axis, means connecting said members at points thereon spaced from the shaft axis, means operatively associated with said connecting means for rocking said sections, a cross arm fixed to each section, a plurality of members fulcrumed on each arm, and means operatively connecting the members on each arm.

Witness my hand this 3d day of November, 1928, county of Dauphin, State of Pennsylvania.

ALFRED W. MARSDEN.